(12) United States Patent
Ding (10) Patent No.: US 11,385,814 B2
(45) Date of Patent: Jul. 12, 2022

(54) METHOD AND DEVICE FOR ALLOCATING RESOURCE OF HARD DISK IN DISTRIBUTED STORAGE SYSTEM

(71) Applicant: HUAWEI CLOUD COMPUTING TECHNOLOGIES CO., LTD., Gui'an New District (CN)

(72) Inventor: Jingwen Ding, Chengdu (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 17/207,274

(22) Filed: Mar. 19, 2021

(65) Prior Publication Data

US 2021/0208802 A1    Jul. 8, 2021

Related U.S. Application Data

(63) Continuation of application No. PCT/CN2019/099628, filed on Aug. 7, 2019.

(30) Foreign Application Priority Data

Sep. 20, 2018   (CN) .......................... 201811105460.5

(51) Int. Cl.
*G06F 3/06* (2006.01)
*G06F 9/50* (2006.01)

(52) U.S. Cl.
CPC .......... *G06F 3/0631* (2013.01); *G06F 3/0604* (2013.01); *G06F 3/067* (2013.01); *G06F 3/0644* (2013.01); *G06F 9/5016* (2013.01)

(58) Field of Classification Search
CPC .... G06F 3/0631; G06F 3/0604; G06F 3/0644; G06F 3/067; G06F 9/5016
See application file for complete search history.

(56) References Cited

U.S. PATENT DOCUMENTS

| | | | |
|---|---|---|---|
| 8,984,243 B1* | 3/2015 | Chen | G06F 3/0631 |
| | | | 711/E12.069 |
| 9,372,636 B1* | 6/2016 | Zeryck | G06F 3/0685 |
| 2005/0278484 A1 | 12/2005 | Mukker et al. | |
| 2010/0125715 A1* | 5/2010 | Takamatsu | G06F 3/0605 |
| | | | 711/170 |
| 2010/0185768 A1 | 7/2010 | Hamedany et al. | |

(Continued)

FOREIGN PATENT DOCUMENTS

| | | |
|---|---|---|
| CN | 105278873 A | 1/2016 |
| CN | 107172222 A | 9/2017 |

(Continued)

*Primary Examiner* — Ryan Bertram
(74) *Attorney, Agent, or Firm* — Leydig, Voit & Mayer, Ltd.

(57) ABSTRACT

This application provides a method for allocating a resource of a hard disk in a distributed storage system. The distributed storage system includes a plurality of hard disks. The method includes: selecting a hard disk set from the plurality of hard disks based on a bandwidth requirement and a storage specification of a first user; and creating first logical storage space for the first user from the hard disk set, where the first storage space of each hard disk in the hard disk set provides storage space for the first logical storage space. In the method, a bandwidth lower limit of the hard disk can be ensured.

8 Claims, 3 Drawing Sheets

(56) References Cited

U.S. PATENT DOCUMENTS

| | | | |
|---|---|---|---|
| 2011/0060878 A1* | 3/2011 | Kaneko | G06F 3/067 |
| | | | 711/170 |
| 2012/0102242 A1 | 4/2012 | Koren et al. | |
| 2016/0034195 A1* | 2/2016 | Li | G06F 3/0683 |
| | | | 711/117 |
| 2016/0291892 A1* | 10/2016 | Rao | G06F 3/0631 |
| 2016/0364167 A1* | 12/2016 | Makida | G06F 3/061 |
| 2017/0344285 A1* | 11/2017 | Choi | G06F 3/0665 |
| 2018/0203638 A1* | 7/2018 | Krueger | G06F 3/0653 |
| 2018/0225147 A1 | 8/2018 | Zhang et al. | |
| 2020/0356272 A1* | 11/2020 | Zhou | G06F 3/0676 |

FOREIGN PATENT DOCUMENTS

| | | |
|---|---|---|
| CN | 107346264 A | 11/2017 |
| CN | 107678927 A | 2/2018 |
| CN | 108196978 A | 6/2018 |
| CN | 108429704 A | 8/2018 |
| CN | 109445684 A | 3/2019 |
| WO | 2010006134 A2 | 1/2010 |

\* cited by examiner

METHOD AND DEVICE FOR ALLOCATING RESOURCE OF HARD DISK IN DISTRIBUTED STORAGE SYSTEM

CROSS-REFERENCE TO RELATED APPLICATIONS

This application is a continuation of International Application No. PCT/CN2019/099628, filed on Aug. 7, 2019, which claims priority to Chinese Patent Application No. 201811105460.5, filed on Sep. 20, 2018. The disclosures of the aforementioned applications are hereby incorporated by reference in their entireties.

TECHNICAL FIELD

This application relates to the computer field, and in particular, to a method and device for allocating a resource of a hard disk in a distributed storage system.

BACKGROUND

As a data storage medium, a hard disk is widely used in the computer field. Generally, in a distributed storage system, a plurality of users share a plurality of hard disks. In a process in which the plurality of users simultaneously use the hard disks to process data, a case of contending for an input/output (I/O) resource occurs. This causes a bandwidth fluctuation, and cannot provide sufficient bandwidth for the users.

SUMMARY

Embodiments of this application provide a method and device for allocating a resource of a hard disk in a distributed storage system, to ensure a bandwidth lower limit of a hard disk.

According to a first aspect, an embodiment of this application provides a method for allocating a resource of a hard disk. The method includes: selecting a hard disk set from the plurality of hard disks based on a bandwidth requirement and a storage specification of a first user, where a storage bandwidth of first storage space of each hard disk in the hard disk set satisfies the bandwidth requirement, a quantity of hard disks in the hard disk set is determined by the storage specification, and the storage specification is based on a multi-copy technology or an erasure coding technology; and creating first logical storage space for the first user from the hard disk set, where the first storage space of each hard disk in the hard disk set provides storage space for the first logical storage space.

In the foregoing method, the hard disk set satisfying the bandwidth requirement of the first user is selected from the plurality of hard disks based on the bandwidth requirement and the storage specification of the first user, and then the first logical storage space is created for the first user from the hard disk set. The first logical storage space may provide sufficient bandwidth for the first user, to avoid that a plurality of users contend for a bandwidth resource, and to satisfy the bandwidth requirement of the first user.

With reference to the first aspect, in an embodiment, the storage specification is based on the multi-copy technology. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a quantity of copies by a positive integer multiple. That the quantity of hard disks in the hard disk set is determined by the storage specification includes: the quantity of hard disks in the hard disk set is the product obtained by multiplying the quantity of copies by the positive integer multiple.

With reference to the first aspect, in an embodiment, the storage specification is based on the erasure coding technology. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a positive integer multiple by a quantity of data disks using the erasure coding technology. That the quantity of hard disks in the hard disk set is determined by the storage specification includes: the quantity of hard disks in the hard disk set is a product obtained by multiplying a positive integer multiple by a sum of the quantity of data disks using the erasure coding technology and a quantity of parity disks using the erasure coding technology.

With reference to the first aspect, in an embodiment, the method further includes: storing, by a second user, data by using a storage bandwidth of the first logical storage space, where the second user does not have the bandwidth requirement. In this manner, utilization of the storage bandwidth of the first logical storage space can be increased while the bandwidth requirement of the first user is satisfied. This avoids bandwidth resource waste.

With reference to the first aspect, in an embodiment, a size of input/output data of each of the plurality of hard disks is a preset value. In this way, a seek time period of the hard disk is shorter than a data transmission time period. This further improves stability of the storage bandwidth.

With reference to the first aspect, in an embodiment, the storage specification is based on the multi-copy technology. That the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying the preset value and a quantity of copies and a positive integer multiple. That the quantity of hard disks in the hard disk set is determined by the storage specification includes: the quantity of hard disks in the hard disk set is a product obtained by multiplying the quantity of copies by the positive integer multiple.

With reference to the first aspect, in an embodiment, the storage specification is based on the erasure coding technology. That the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying a positive integer multiple and a quantity of data disks using the erasure coding technology and the preset value. That the quantity of hard disks in the hard disk set is determined by the storage specification includes: the quantity of hard disks in the hard disk set is a product obtained by multiplying a positive integer multiple by a sum of the quantity of data disks using the erasure coding technology and a quantity of parity disks using the erasure coding technology.

According to a second aspect, an embodiment of this application provides a resource allocation device. The resource allocation device includes a selection unit and a creation unit. The selection unit is configured to select a hard disk set from the plurality of hard disks based on a bandwidth requirement and a storage specification of a first user, where a storage bandwidth of first storage space of each hard disk in the hard disk set satisfies the bandwidth requirement, a quantity of hard disks in the hard disk set is determined by the storage specification, and the storage specification is based on a multi-copy technology or an erasure coding technology. The creation unit is configured to create first logical storage space for the first user from the hard disk set, where the first storage space of each hard disk in the hard disk set provides storage space for the first logical storage space.

In the foregoing device, the hard disk set satisfying the bandwidth requirement of the first user is selected from the plurality of hard disks based on the bandwidth requirement and the storage specification of the first user, and then the first logical storage space is created for the first user from the hard disk set. The first logical storage space may provide sufficient bandwidth for the first user, to avoid that a plurality of users contend for a bandwidth resource, and to satisfy the bandwidth requirement of the first user.

With reference to the second aspect, in an embodiment, the storage specification is based on the multi-copy technology. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a quantity of copies by a positive integer multiple. That the quantity of hard disks in the hard disk set is determined by the storage specification includes: the quantity of hard disks in the hard disk set is the product obtained by multiplying the quantity of copies by the positive integer multiple.

With reference to the second aspect, in an embodiment, the storage specification is based on the erasure coding technology. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a positive integer multiple by a quantity of data disks using the erasure coding technology. That the quantity of hard disks in the hard disk set is determined by the storage specification includes: the quantity of hard disks in the hard disk set is a product obtained by multiplying a positive integer multiple by a sum of the quantity of data disks using the erasure coding technology and a quantity of parity disks using the erasure coding technology.

With reference to the second aspect, in an embodiment, the first logical storage space is further used to provide the storage bandwidth for a second user, and the second user does not have the bandwidth requirement. By using the device, utilization of the storage bandwidth of the first logical space can be increased while the bandwidth requirement of the first user is satisfied. This avoids bandwidth resource waste.

With reference to the second aspect, in an embodiment, a size of input/output data of each of the plurality of hard disks is a preset value. By using the device, a seek time period of the hard disk is shorter than a data transmission time period. This further improves stability of the storage bandwidth.

With reference to the second aspect, in an embodiment, the storage specification is based on the multi-copy technology. That the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying the preset value and a quantity of copies and a positive integer multiple. That the quantity of hard disks in the hard disk set is determined by the storage specification includes: the quantity of hard disks in the hard disk set is a product obtained by multiplying the quantity of copies by the positive integer multiple.

With reference to the second aspect, in an embodiment, the storage specification is based on the erasure coding technology. That the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying a positive integer multiple and a quantity of data disks using the erasure coding technology and the preset value. That the quantity of hard disks in the hard disk set is determined by the storage specification includes: the quantity of hard disks in the hard disk set is a product obtained by multiplying a positive integer multiple by a sum of the quantity of data disks using the erasure coding technology and a quantity of parity disks using the erasure coding technology.

According to a third aspect, an embodiment of this application provides a resource allocation device, including a processor and a memory. The memory is configured to store a program instruction, and the processor is configured to perform, based on the program instruction, the method described in any one of the first aspect or the possible implementations of the first aspect.

According to a fourth aspect, an embodiment of this application provides a computer-readable storage medium. The computer-readable storage medium stores a program instruction, and when the program instruction is run by a computer, the computer performs the method described in any one of the first aspect or the possible implementations of the first aspect.

According to a fifth aspect, an embodiment of this application provides a computer program. When the computer program runs on a processor, the processor performs the method described in any one of the first aspect or the possible implementations of the first aspect.

In this embodiment of this application, the hard disk set satisfying the bandwidth requirement of the first user is selected from the plurality of hard disks based on the bandwidth requirement and the storage specification of the first user, and then the first logical storage space is created for the first user from the hard disk set. The first logical storage space may provide sufficient bandwidth for the first user, to avoid that a plurality of users contend for a bandwidth resource, and to satisfy the bandwidth requirement of the first user.

BRIEF DESCRIPTION OF DRAWINGS

To describe the technical solutions in the embodiments of this application more clearly, the following briefly describes the accompanying drawings for describing the embodiments.

DESCRIPTION OF EMBODIMENTS

The following describes the technical solutions in embodiments of this application in more detail.

Figure 1:
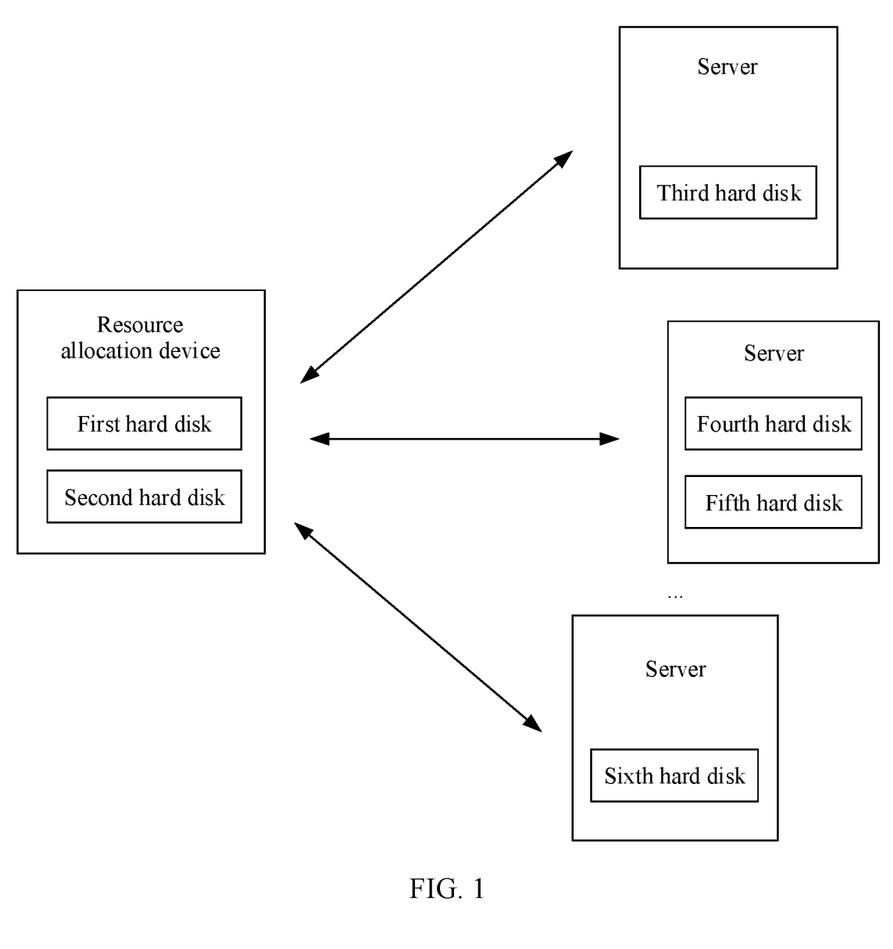
FIG. 1 is a schematic diagram of a system architecture of a distributed storage system according to an embodiment of this application.

FIG. 1 is a schematic diagram of a system architecture of a distributed storage system according to an embodiment of this application. The system includes a resource allocation device and a plurality of hard disks. The following describes the resource allocation device and the plurality of hard disks.

For the resource allocation device, the resource allocation device may be a server, can respond to a service request, and process the service request, and has a capability of bearing a service and ensuring the service. In this embodiment of this application, the resource allocation device has a function of allocating a resource of a hard disk. A hard disk set satisfying a bandwidth requirement of a first user is selected from the plurality of hard disks based on the bandwidth requirement and a storage specification of the first user, and then first logical storage space is created for the first user from the hard disk set. The first logical storage space may provide sufficient bandwidth for the first user, to avoid that a plurality of users contend for a bandwidth resource, and to satisfy the bandwidth requirement of the first user.

The plurality of hard disks are used to store data. The plurality of hard disks may be all integrated in the resource allocation device. The plurality of hard disks may also be located in one or more servers, or may also be located in a storage array. FIG. 1 shows a case in which some of the plurality of hard disks are located in the resource allocation device, and some of the plurality of hard disks are located in the plurality of servers other than the resource allocation device. In this embodiment of this application, after the resource allocation device allocates storage resources of the plurality of hard disks, disk storage space in the plurality of hard disks provides storage space for a user to which the disk storage space is correspondingly allocated.

Figure 2:
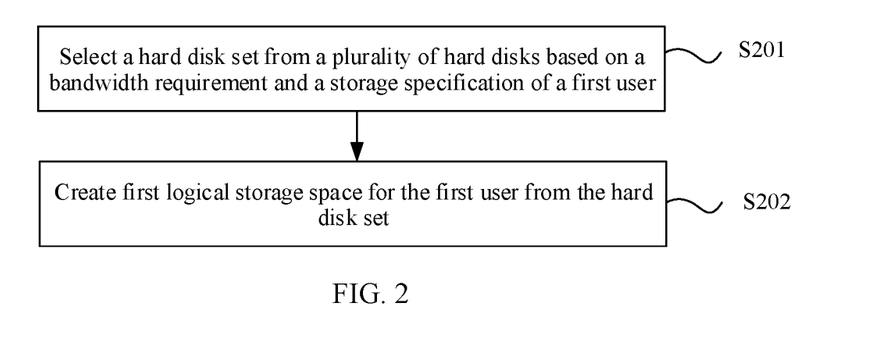
FIG. 2 is a flowchart of a method for allocating a resource of a hard disk in a distributed storage system according to an embodiment of this application.

FIG. 2 is a flowchart of a method for allocating a resource of a hard disk according to an embodiment of this application. The method may be implemented based on the architecture shown in FIG. 1. A resource allocation device described below may be the resource allocation device in the system architecture shown in FIG. 1. A plurality of hard disks may be the plurality of hard disks in the system architecture shown in FIG. 1. The method includes but is not limited to the following steps.

S201: Select a hard disk set from the plurality of hard disks based on a bandwidth requirement and a storage specification of a first user.

A storage bandwidth of first storage space of each hard disk in the hard disk set satisfies the bandwidth requirement. A quantity of hard disks in the hard disk set is determined by the storage specification. The storage specification is based on a multi-copy technology or an erasure coding (EC) technology. Specifically, input/output operations per second (IOPS) of the hard disk may indicate the storage bandwidth.

Optionally, before selecting the hard disk set from the plurality of hard disks based on the bandwidth requirement and the storage specification of the first user, the method further includes: comparing a sum of IOPS values of idle storage space in the plurality of hard disks with the bandwidth requirement of the first user; if the sum of the IOPS values of the idle storage space in the plurality of hard disks is greater than or equal to the bandwidth requirement of the first user, triggering execution of an operation of selecting the hard disk set from the plurality of hard disks based on the bandwidth requirement and the storage specification of the first user; and if the sum of the IOPS values of the idle storage space in the plurality of hard disks is less than the bandwidth requirement of the first user, determining that first logical storage space fails to be created.

The following describes a method for selecting the hard disk set from the plurality of hard disks based on the bandwidth requirement and the storage specification of the first user.

First, a case in which the storage specification is the multi-copy technology is described. The multi-copy technology determines a quantity of copies. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying the quantity of copies by a positive integer multiple. That the quantity of hard disks in the hard disk set is determined by the storage specification includes: the quantity of hard disks in the hard disk set is the product obtained by multiplying the quantity of copies by the positive integer multiple.

The positive integer multiple of the quantity of copies may be a positive integer such as 1, 2, or 3, and represent a quantity of groups of copy disks that run in parallel. For example, the positive integer multiple of the copy disks is 3, and represents three groups of the copy disks that run in parallel. A quantity of disks in each group is equal to the quantity of copies.

For example, if the storage specification of the first user is the multi-copy technology, the quantity of copies determined by using the multi-copy technology is P, the bandwidth requirement of the first user is a, and the positive integer multiple of the copies is 1, an IOPS of the first storage space of each hard disk in the hard disk set is not less than a ratio a of the bandwidth requirement a to a positive integer multiple 1 of the quantity of copies. The quantity of hard disks in the hard disk set is a product P obtained by multiplying the quantity of copies P by the positive integer multiple 1.

In an embodiment, if a quantity of hard disks found in the plurality of hard disks is greater than or equal to the quantity of hard disks, a hard disk set may be determined based on the found hard disks. If the quantity of hard disks found in the plurality of hard disks is less than the quantity of hard disks, the positive integer multiple of the quantity of copies may be increased (for example, from 1 to 2, from 2 to 3, and so on). Then, a storage bandwidth of first storage space of each hard disk in the reselected hard disk set is not less than a ratio of the bandwidth requirement to an increased positive integer multiple of the quantity of copies. A quantity of hard disks in the reselected hard disk set is the product obtained by multiplying the quantity of copies by the increased positive integer multiple. In this manner, a requirement on the IOPS of the first storage space of each hard disk in the hard disk set can be reduced by increasing the quantity of groups of the copy disks that run in parallel, and resource allocation reliability is improved.

Then, a case in which the storage specification is the EC technology is described. The EC technology determines a quantity of data disks and a quantity of parity disks. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a positive integer multiple by a quantity of data disks in the EC technology. That the quantity of hard disks in the hard disk set is determined by the storage specification includes: the quantity of hard disks in the hard disk set is a product obtained by multiplying a positive integer multiple by a sum of the quantity of data disks in the EC technology and a quantity of parity disks in the EC technology.

A positive integer multiple of the data disks may be a positive integer such as 1, 2, or 3, and represents a quantity of groups that include the data disks in the EC technology and the parity disks in the EC technology and that run in parallel. For example, the positive integer multiple of the data disk is 2, and represents two groups that include the data disks in the EC technology and the parity disks in the EC technology and that run in parallel.

For example, if the storage specification of the first user is the EC technology, the quantity of data disks determined by using the EC technology is N, the quantity of parity disks is M, the bandwidth requirement of the first user is a, and the positive integer multiple of the copy disks is 2, the IOPS of the first storage space of each hard disk in the hard disk set is not less than the ratio a/2N of the bandwidth requirement a to a product 2N obtained by multiplying the positive integer multiple by the quantity of data disks. The quantity of hard disks in the hard disk set is the positive integer multiple 2(N+M) of the sum of the quantity N of the data disks and the quantity M of the parity disks.

In an embodiment, if a quantity of hard disks found in the plurality of hard disks is greater than or equal to the quantity of hard disks, a hard disk set may be determined based on the found hard disks. If the quantity of hard disks found in the plurality of hard disks is less than the quantity P of hard disks, the positive integer multiple of the data disks may be increased (for example, increased from 1 to 2, increased from 2 to 3). A storage bandwidth of first storage space of each hard disk in the reselected hard disk set is not less than a ratio of the bandwidth requirement to a product obtained by multiplying an increased positive integer multiple by the quantity of data disks. The quantity of hard disks in the reselected hard disk set is a product obtained by multiplying the increased positive integer multiple by a sum of the quantity of data disks and the quantity of parity disks. In this manner, a requirement on the IOPS of the first storage space of each hard disk in the hard disk set can be reduced by increasing the quantity of groups of the hard disks that run in parallel, and resource allocation reliability is improved.

In an embodiment, a size of input/output data of each of the plurality of hard disks is a preset value. For example, the preset value is 1M, 2M, 4M, or the like. In this way, a seek time period of the hard disk is shorter than a data transmission time period. This further improves stability of the storage bandwidth.

When the size of the input/output data of each of the plurality of hard disks is the preset value, if the storage specification is based on the multi-copy technology, the quantity of copy disks is determined by using the multi-copy technology, that the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying the preset value and a quantity of copies and a positive integer multiple. That the quantity of hard disks in the hard disk set is determined by the storage specification includes: the quantity of hard disks in the hard disk set is a product obtained by multiplying the quantity of copies by the positive integer multiple.

If the storage specification is based on the erasure coding technology, that the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying a positive integer multiple and a quantity of data disks in the EC technology and the preset value. That the quantity of hard disks in the hard disk set is determined by the storage specification includes: the quantity of hard disks in the hard disk set is a product obtained by multiplying a positive integer multiple by a sum of the quantity of data disks in the EC technology and the quantity of parity disks in the EC technology.

S202: Create first logical storage space for the first user from the hard disk set.

Figure 3:
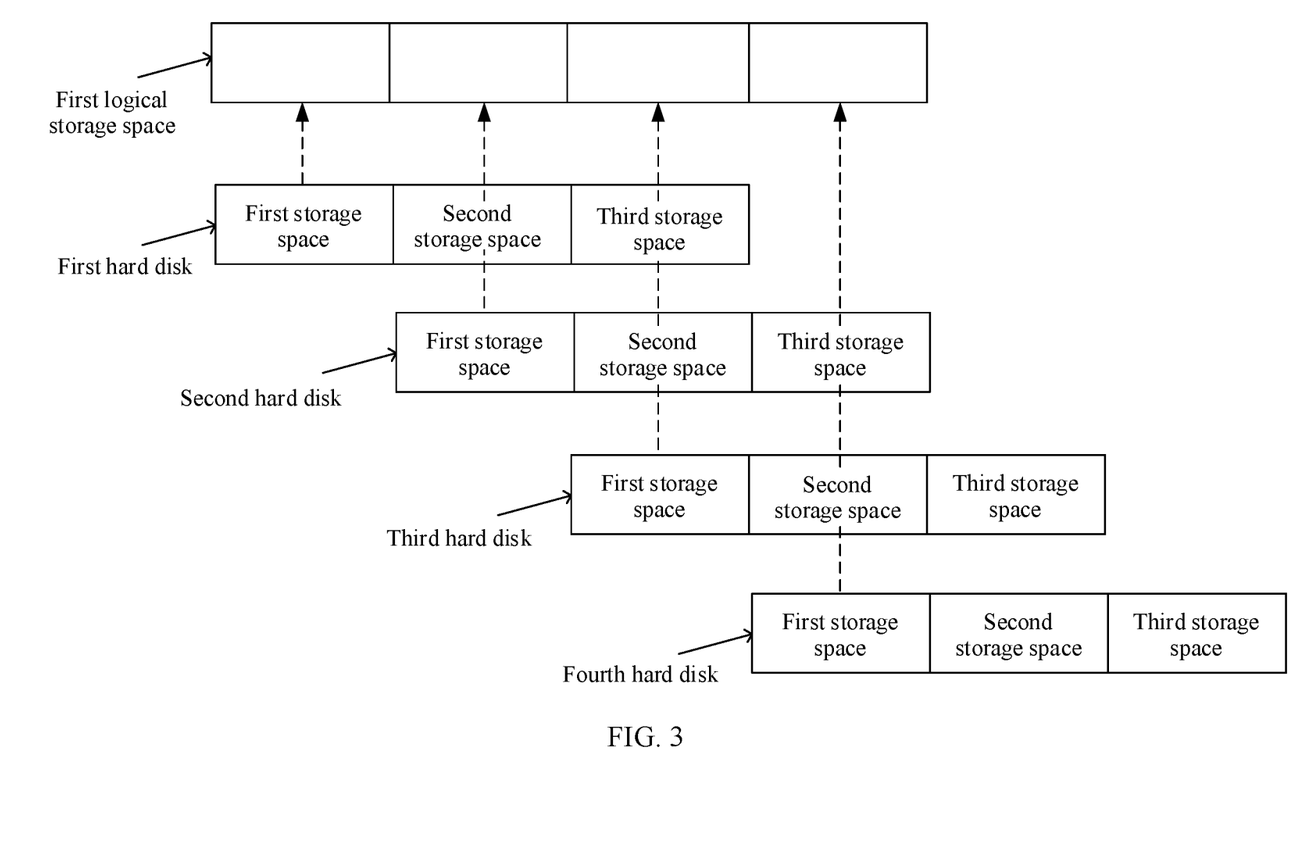
FIG. 3 is a schematic diagram of first logical storage space according to an embodiment of this application.

The first storage space of each hard disk in the hard disk set provides storage space for the first logical storage space. FIG. 3 is a schematic diagram of first logical storage space according to an embodiment of this application. The hard disk set includes a first hard disk, a second hard disk, a third hard disk, and a fourth hard disk.

For example, after the first logical storage space is created for the first user from the hard disk set, the method further includes: deducting a storage bandwidth of idle storage space in each hard disk included in the hard disk set, where a deducted storage bandwidth of idle storage space in the first hard disk in the hard disk set is the same as a storage bandwidth of selected first storage space in the first hard disk.

In an embodiment, a second user stores data by using a storage bandwidth of the first logical storage space, and the second user does not have the bandwidth requirement.

For example, usage of the storage bandwidth of the first logical storage space of the first user may be detected based on a first threshold (for example, 20% or 30%). Usage of storage bandwidth of second logical storage space of the second user may be detected based on a second threshold (for example, 80% or 90%). The first threshold is less than the second threshold. If the usage of the storage bandwidth of the first logical storage space of the first user is less than the first threshold, and the usage of the storage bandwidth of the second logical storage space of the second user is greater than the second threshold, a bandwidth resource adjustment mechanism is enabled, and in the bandwidth resource adjustment mechanism, the second user may store data by using the storage bandwidth of the first logical storage space.

In an embodiment, that the usage of the storage bandwidth of the first logical storage space of the first user is less than the first threshold, and the usage of the storage bandwidth of the second logical storage space of the second user is greater than the second threshold may be: The usage of the storage bandwidth of the first logical storage space of the first user is all less than the first threshold within a preset period, and the usage of the storage bandwidth of the second logical storage space of the second user is all greater than the second threshold within the preset period. For example, if the preset period is 10 minutes, in a period from 10:00 to 10:10, the usage of the storage bandwidth of the first logical storage space of the first user is less than the first threshold, and the usage of the storage bandwidth of the second logical storage space of the second user is greater than the second threshold, the bandwidth resource adjustment mechanism is enabled.

In an embodiment, in the bandwidth resource adjustment mechanism, a reserved storage bandwidth is determined based on a used bandwidth resource in the first logical storage space. A value of the reserved storage bandwidth is a product of a value of the used storage bandwidth in the first logical storage space and a preset proportion value (for example, 50%, 60%). The second user may store data by using a storage bandwidth other than the reserved storage bandwidth in the storage bandwidth of the first logical storage space.

In an embodiment, the usage of the storage bandwidth of the first logical storage space of the first user is detected based on a third threshold (for example, 60% or 65%). The third threshold is greater than the first threshold, and less than or equal to the second threshold. If the usage of the storage bandwidth of the first logical storage space of the first user is greater than the third threshold, the bandwidth resource adjustment mechanism is disabled.

In the forgoing manner, utilization of the storage bandwidth of the first logical space can be increased while the bandwidth requirement of the first user is satisfied. This avoids bandwidth resource waste.

In the method shown in FIG. 2, the hard disk set satisfying the bandwidth requirement of the first user is selected from the plurality of hard disks based on the bandwidth requirement and the storage specification of the first user, and then the first logical storage space is created for the first user from the hard disk set. The first logical storage space may provide sufficient bandwidth for the first user, to avoid that a plurality of users contend for a bandwidth resource, and to satisfy the bandwidth requirement of the first user.

Figure 4:
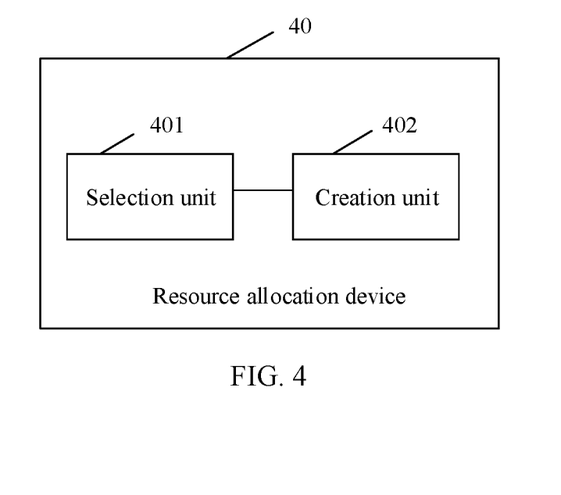
FIG. 4 is a schematic diagram of an allocation device according to an embodiment of this application.

FIG. 4 shows a resource allocation device according to an embodiment of this application. A resource allocation device 40 includes a selection unit 401 and a creation unit 402. The following describes the foregoing units.

The selection unit 401 is configured to select a hard disk set from the plurality of hard disks based on a bandwidth requirement and a storage specification of a first user, where a storage bandwidth of first storage space of each hard disk in the hard disk set satisfies the bandwidth requirement, a quantity of hard disks in the hard disk set is determined by the storage specification, and the storage specification is based on a multi-copy technology or an erasure coding technology.

The creation unit 402 is configured to create first logical storage space for the first user from the hard disk set, where the first storage space of each hard disk in the hard disk set provides storage space for the first logical storage space.

In an embodiment, the storage specification is based on the multi-copy technology. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a quantity of copies by a positive integer multiple. That the quantity of hard disks in the hard disk set is determined by the storage specification includes: the quantity of hard disks in the hard disk set is the product obtained by multiplying the quantity of copies by the positive integer multiple.

In an embodiment, the storage specification is based on the erasure coding technology. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a positive integer multiple by a quantity of data disks using the erasure coding technology. That the quantity of hard disks in the hard disk set is determined by the storage specification includes: the quantity of hard disks in the hard disk set is a product obtained by multiplying a positive integer multiple by a sum of the quantity of data disks using the erasure coding technology and a quantity of parity disks using the erasure coding technology.

In an embodiment, the first logical storage space is further used to provide the storage bandwidth for a second user, and the second user does not have the bandwidth requirement. By using the device, utilization of the storage bandwidth of the first logical space can be increased while the bandwidth requirement of the first user is satisfied. This avoids bandwidth resource waste.

In an embodiment, a size of input/output data of each of the plurality of hard disks is a preset value. By using the device, a seek time period of the hard disk is shorter than a data transmission time period. This further improves stability of the storage bandwidth.

In an embodiment, the storage specification is based on the multi-copy technology. That the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying the preset value and a quantity of copies and a positive integer multiple. That the quantity of hard disks in the hard disk set is determined by the storage specification includes: the quantity of hard disks in the hard disk set is a product obtained by multiplying the quantity of copies by the positive integer multiple.

In an embodiment, the storage specification is based on the erasure coding technology. That the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying a positive integer multiple and a quantity of data disks using the erasure coding technology and the preset value. That the quantity of hard disks in the hard disk set is determined by the storage specification includes: the quantity of hard disks in the hard disk set is a product obtained by multiplying a positive integer multiple by a sum of the quantity of data disks using the erasure coding technology and a quantity of parity disks using the erasure coding technology.

For implementation of each operation in FIG. 4, refer to corresponding descriptions in the method embodiment shown in FIG. 2.

In the device shown in FIG. 4, the hard disk set satisfying the bandwidth requirement of the first user is selected from the plurality of hard disks based on the bandwidth requirement and the storage specification of the first user, and then the first logical storage space is created for the first user from the hard disk set. The first logical storage space may provide sufficient bandwidth for the first user, to avoid that a plurality of users contend for a bandwidth resource, and to satisfy the bandwidth requirement of the first user.

Figure 5:
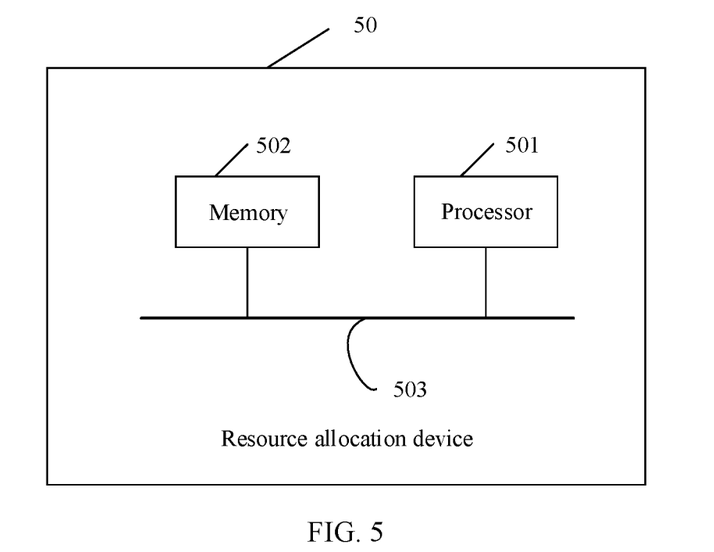
FIG. 5 is a schematic diagram of another allocation device according to an embodiment of this application.

FIG. 5 is a schematic diagram of another resource allocation device according to an embodiment of this application. The resource allocation device 50 may include one or more processors 501 and a memory 502. The processor 501 and the memory 502 are connected by using a bus 503. The memory 502 is configured to store an instruction.

The processor 501 may be a central processing unit, or the processor may be another general purpose processor, a digital signal processor, an application-specific integrated circuit, another programmable logic device, or the like. The general purpose processor may be a microprocessor, or the processor may be any conventional processor or the like.

The memory 502 may include a read-only memory and a random access memory, and provide an instruction and data to the processor 501. A part of the memory 502 may further include a non-volatile random access memory. For example, the memory 502 may further store information of a device type.

The processor 501 is configured to run the instruction stored in the memory 502 to perform the following operations:

selecting a hard disk set from the plurality of hard disks based on a bandwidth requirement and a storage specification of a first user, where a storage bandwidth of first storage space of each hard disk in the hard disk set satisfies the bandwidth requirement, a quantity of hard disks in the hard disk set is determined by the storage specification, and the storage specification is based on a multi-copy technology or an erasure coding technology; and creating first logical storage space for the first user from the hard disk set, where the first storage space of each hard disk in the hard disk set provides storage space for the first logical storage space.

In an embodiment, the storage specification is based on the multi-copy technology. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a quantity of copies by a positive integer multiple. That the quantity of hard disks in the hard disk set is determined by the storage specification includes: the quantity of hard disks in the hard disk set is the product obtained by multiplying the quantity of copies by the positive integer multiple.

In an embodiment, the storage specification is based on the erasure coding technology. That the storage bandwidth of the first storage space of each hard disk in the hard disk set satisfies the bandwidth requirement includes: the storage bandwidth of the first storage space of each hard disk in the hard disk set is not less than a ratio of the bandwidth requirement to a product obtained by multiplying a positive integer multiple by a quantity of data disks using the erasure coding technology. That the quantity of hard disks in the hard disk set is determined by the storage specification includes: the quantity of hard disks in the hard disk set is a product obtained by multiplying a positive integer multiple by a sum of the quantity of data disks using the erasure coding technology and a quantity of parity disks using the erasure coding technology.

In an embodiment, the first logical storage space is further used to provide the storage bandwidth for a second user, and the second user does not have the bandwidth requirement. By using the device, utilization of the storage bandwidth of the first logical space can be increased while the bandwidth requirement of the first user is satisfied. This avoids bandwidth resource waste.

In an embodiment, a size of input/output data of each of the plurality of hard disks is a preset value. By using the device, a seek time period of the hard disk is shorter than a data transmission time period. This further improves stability of the storage bandwidth.

In an embodiment, the storage specification is based on the multi-copy technology. That the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying the preset value and a quantity of copies and a positive integer multiple. That the quantity of hard disks in the hard disk set is determined by the storage specification includes: the quantity of hard disks in the hard disk set is a product obtained by multiplying the quantity of copies by the positive integer multiple.

In an embodiment, the storage specification is based on the erasure coding technology. That the storage bandwidth of the first storage space of each hard disk in the hard disk set satisfies the bandwidth requirement includes: the storage bandwidth of the first storage space of each hard disk in the hard disk set is not less than a quotient obtained by dividing the bandwidth requirement by a product obtained by multiplying a positive integer multiple and a quantity of data disks using the erasure coding technology and the preset value. That the quantity of hard disks in the hard disk set is determined by the storage specification includes: the quantity of hard disks in the hard disk set is a product obtained by multiplying a positive integer multiple by a sum of the quantity of data disks using the erasure coding technology and a quantity of parity disks using the erasure coding technology.

For implementation of each operation in FIG. 5, refer to corresponding descriptions in the method embodiment shown in FIG. 2.

In the device shown in FIG. 5, the hard disk set satisfying the bandwidth requirement of the first user is selected from the plurality of hard disks based on the bandwidth requirement and the storage specification of the first user, and then the first logical storage space is created for the first user from the hard disk set. The first logical storage space may provide sufficient bandwidth for the first user, to avoid that a plurality of users contend for a bandwidth resource, and to satisfy the bandwidth requirement of the first user.

Another embodiment of the present disclosure provides a computer program product. When the computer program product runs on a computer, the method in the embodiment shown in FIG. 2 is implemented.

Another embodiment of the present disclosure provides a computer-readable storage medium. The computer-readable storage medium stores a computer program, and when the computer program is executed by a computer, the method in the embodiment shown in FIG. 2 is implemented.

What is claimed is:

1. A method for allocating a resource of a hard disk in a distributed storage system, wherein the distributed storage system comprises a plurality of hard disks, and the method comprises:

selecting, by a resource allocation device, a hard disk set from the plurality of hard disks based on a bandwidth requirement and a storage specification of a first user, wherein a storage bandwidth of first storage space of each hard disk in the hard disk set satisfies the bandwidth requirement, a quantity of hard disks in the hard disk set is determined by based on the storage specification, and the storage specification is based on a multi-copy technology or an erasure coding technology; and creating, by the resource allocation device, a first logical storage space for the first user from the hard disk set, wherein the first storage space of each hard disk in the hard disk set provides storage space for the first logical storage space.

2. The method according to claim 1, wherein the storage specification is based on the multi-copy technology;

wherein that the storage bandwidth of the first storage space of each hard disk in the hard disk set satisfies the bandwidth requirement comprises:

the storage bandwidth of the first storage space of each hard disk in the hard disk set is not less than a ratio of the bandwidth requirement to a product obtained by multiplying a quantity of copies by a positive integer multiple; and wherein that the quantity of hard disks in the hard disk set is determined by based on the storage specification comprises:

the quantity of hard disks in the hard disk set is the product obtained by multiplying the quantity of copies by the positive integer multiple.

3. The method according to claim 1, wherein the storage specification is based on the erasure coding technology;

wherein that the storage bandwidth of the first storage space of each hard disk in the hard disk set satisfies the bandwidth requirement comprises:

the storage bandwidth of the first storage space of each hard disk in the hard disk set is not less than a ratio of the bandwidth requirement to a product obtained by multiplying a positive integer multiple by a quantity of data disks using the erasure coding technology; and wherein that the quantity of hard disks in the hard disk set is determined by based on the storage specification comprises:

the quantity of hard disks in the hard disk set is a product obtained by multiplying a positive integer multiple by a sum of the quantity of data disks using the erasure coding technology and a quantity of parity disks using the erasure coding technology.

4. The method according to claim 1, wherein a size of input/output (IO) data of each of the plurality of hard disks is a preset value.

5. A resource allocation device, comprising
a processor and
a memory, wherein the memory is configured to store a program instruction, wherein execution of the program instruction by the processor, causes the processor to:

select a hard disk set from the plurality of hard disks based on a bandwidth requirement and a storage specification of a first user, wherein a storage bandwidth of first storage space of each hard disk in the hard disk set satisfies the bandwidth requirement, a quantity of hard disks in the hard disk set is determined based on the storage specification, and the storage specification is based on a multi-copy technology or an erasure coding technology; and create a first logical storage space for the first user from the hard disk set, wherein the first storage space of each hard disk in the hard disk set provides storage space for the first logical storage space.

6. The device according to claim 5, wherein the storage specification is based on the multi-copy technology;

wherein that the storage bandwidth of the first storage space of each hard disk in the hard disk set satisfies the bandwidth requirement comprises:

the storage bandwidth of the first storage space of each hard disk in the hard disk set is not less than a ratio of the bandwidth requirement to a product obtained by multiplying a quantity of copies by a positive integer multiple; and wherein that the quantity of hard disks in the hard disk set is determined based on the storage specification comprises:

the quantity of hard disks in the hard disk set is the product obtained by multiplying the quantity of copies by the positive integer multiple.

7. The device according to claim 5, wherein the storage specification is based on the erasure coding technology;

wherein that the storage bandwidth of the first storage space of each hard disk in the hard disk set satisfies the bandwidth requirement comprises:

the storage bandwidth of the first storage space of each hard disk in the hard disk set is not less than a ratio of the bandwidth requirement to a product obtained by multiplying a positive integer multiple by a quantity of data disks using the erasure coding technology; and wherein that the quantity of hard disks in the hard disk set is determined by based on the storage specification comprises:

the quantity of hard disks in the hard disk set is a product obtained by multiplying a positive integer multiple by a sum of the quantity of data disks using the erasure coding technology and a quantity of parity disks using the erasure coding technology.

8. The device according to claim 5, wherein a size of input/output (IO) data of each of the plurality of hard disks is a preset value.

* * * * *

UNITED STATES PATENT AND TRADEMARK OFFICE
CERTIFICATE OF CORRECTION

PATENT NO. : 11,385,814 B2
APPLICATION NO. : 17/207274
DATED : July 12, 2022
INVENTOR(S) : Ding Page 1 of 1

It is certified that error appears in the above-identified patent and that said Letters Patent is hereby corrected as shown below:

In the Claims

Claim 1: Column 13, Line 3: "disk set is determined by based on the storage speci-" should read -- disk set is determined based on the storage speci- --.

Claim 2: Column 13, Line 23: "is determined by based on the storage specification" should read -- is determined based on the storage specification --.

Claim 3: Column 13, Line 39: "is determined by based on the storage specification" should read -- is determined based on the storage specification --.

Claim 7: Column 14, Line 43: "is determined by based on the storage specification" should read -- is determined based on the storage specification --.

Signed and Sealed this
Twenty-second Day of November, 2022

Katherine Kelly Vidal
*Director of the United States Patent and Trademark Office*